(12) United States Patent
Dray, Sr.

(10) Patent No.: US 6,413,076 B1
(45) Date of Patent: Jul. 2, 2002

(54) SHUT-OFF NOZZLE

(76) Inventor: Robert F. Dray, Sr., 6610 Mimosa La., Dallas, TX (US) 75238

( * ) Notice: Subject to any disclaimer, the term of this patent is extended or adjusted under 35 U.S.C. 154(b) by 0 days.

(21) Appl. No.: 09/454,902

(22) Filed: Dec. 3, 1999

(51) Int. Cl.[7] .............................................. B29C 45/23
(52) U.S. Cl. ...................................... 425/562; 425/564
(58) Field of Search ................................ 425/562, 563, 425/564, 565, 566

(56) References Cited

U.S. PATENT DOCUMENTS

| | | | |
|---|---|---|---|
| 3,719,310 A | * | 3/1973 | Hunten |
| 3,934,626 A | * | 1/1976 | Hall ........................... 425/565 |
| 4,394,117 A | | 7/1983 | Taylor |
| 5,164,207 A | | 11/1992 | Durina |
| 5,208,052 A | | 5/1993 | Schmidt |
| 5,830,524 A | | 11/1998 | Braun |
| 5,975,127 A | * | 11/1999 | Dray ........................... 425/564 |

* cited by examiner

*Primary Examiner*—Tim Heitbrink
(74) *Attorney, Agent, or Firm*—Mark D. Perdue

(57) ABSTRACT

An elongate projection or probe extends from the injection unit of an injection molding apparatus. A passage extends through the projection in fluid communication with the injection unit. A generally cylindrical receptacle is formed in a portion of the mold of the injection molding apparatus for receiving the projection in generally concentric sliding relation. The receptacle is in fluid communication with the mold cavity, wherein relative movement between the projection and the receptacle causes injection unit to be selectively in fluid communication with the mold.

30 Claims, 5 Drawing Sheets

SHUT-OFF NOZZLE

BACKGROUND OF THE INVENTION

1. Field of the Invention

The present invention relates to a shut-off valve for use with injection molding apparatus. In particular, the shut-off valve is used to positively halt or stop material flow from an injection unit into the mold portion of the injection molding apparatus.

2. Summary of Prior Art

Injection molding-the process of injecting a quantity, or shot, of molten plastic into a mold—is today one of the world's dominant forms of plastic article manufacture. In this process, plastic or polymer is made flowable by a combination of the application of heat and kinetic energy, usually through the use of a flighted screw that rotates and reciprocates within a heated containment barrel. A mold is designed and manufactured with a cavity configuration that allows for the specific part or parts to be molded. The mold is mounted in the injection molding machine clamp. Inside the mold on the upstream end is a sprue bushing. The flowable plastic then is injected, usually by action of the screw, into the mold cavities of a mold coupled to the injection unit.

The conventional coupling between the injection unit and the mold comprises a projection from the injection unit, commonly called the nozzle, which mates with a depression formed in a portion of the mold called the sprue bushing. Conventionally, the nozzle has a convex hemispherical shape that registers with a corresponding hemispherical depression in the sprue bushing. While this hemispherical arrangement is standard in the industry and lends a self-aligning feature to the coupling, it is not resistant to leaks and is the source of messy and possibly dangerous "drooling" of molten plastic. The seal is dependent on proper alignment and properly machined hemispherical components. If either of these components is damaged or misaligned, leakage may occur. Leakage is common and many times this leaked plastic can catch on fire as many times the sprue bushing freezes up and must be heated with a torch.

Typically, the injection unit is mounted on an hydraulically actuated "sled" that brings the nozzle into contact with the sprue bushing. The sled is provided to perform an operation known as "sprue break" that is not common now that heated runner systems are common in injection molds. Before heated sprues, frozen or solidified plastic would accumulate in the sprue bushing and nozzle. The sled was used to separate the sprue bushing and nozzle to break the frozen plastic "sprue." Most injection molding apparatus are still provided with an hydraulic or electric sled arrangement.

Before an injection molding process begins, it is common to purge the injection unit of air to insure a full shot of plastic into the mold. Commonly, this is done while the nozzle and sprue bushing are separated and the sprue bushing and platen (part of the mold assembly) are covered with cardboard to prevent plastic from solidifying or freezing over these components. Then, the nozzle is brought against the sprue bushing and injection may begin. Plastic from leakage and purging presents a fire hazard as well as being dangerous to nearby personnel.

In many injection molding applications, it is desirable to be able to positively halt or "shut-off" the flow of plastic from the injection unit into the mold tool. Conventionally, a valve is provided to accomplish this function that is called, logically, a "shut-off" valve. These valves typically are located between the injection unit and the mold itself.

Some conventional shut-off valves are operated by forced contact between the nozzle portion of the injection unit and the mold, that is, when the nozzle is pressed firmly against the mold tool, flow is permitted, when the nozzle pressure is released, flow is halted or shut-off. An improvement or variation on this arrangement is found in U.S. Pat. No. 3,719,310, Mar. 6, 1973, which provides a rather complex valving arrangement that permits a limited flow from the nozzle even when the nozzle is not in contact with the sprue bushing for purging of the injection unit.

Other shut-off valves use various mechanical, pneumatic, and hydraulic actuators to cycle the valve between permitting and obstructing flow between the injection unit and the mold. An example of a pneumatically operated shut-off valve is found in commonly owned U.S. Pat. No. 5,975,127.

A drawback to such valves is that they typically require extensive modification of existing injection molding apparatus. The modifications required typically serve no other purpose than to permit the use of a shut-off valve. Additionally, many of the valves require additional power sources for actuation, such as pressurized air or hydraulic fluid, which adds more equipment and maintenance to an already complicated assembly.

A need exists, therefore, for an improved coupling and shut-off valve that addresses the shortcomings found in the prior art.

SUMMARY OF THE INVENTION

It is a general object of the present invention to provide an improved coupling between an injection unit and mold of an injection molding apparatus that incorporates a shut-off feature that is positively actuated.

This and other objects of the present invention are achieved by providing an elongate projection from the injection unit. A passage extends through the projection in fluid communication with the injection unit. A generally cylindrical receptacle is formed in a portion of the mold for receiving the projection in generally concentric sliding relation. The receptacle is in fluid communication with the mold cavity, wherein relative movement between the projection and the receptacle causes injection unit to be selectively in fluid communication with the mold.

According to one embodiment of the preferred invention, the elongate projection includes a generally conical end portion.

According to one embodiment of the preferred invention, the receptacle has a generally conical opening.

According to one embodiment of the preferred invention, the elongate projection includes at least one port extending transversely and in communication with the passage.

According to one embodiment of the preferred invention, the receptacle is dimensioned to obstruct and seal the port in the projection against fluid flow.

According to one embodiment of the preferred invention, the receptacle includes an enlarged-diameter portion, wherein, upon alignment with between the projection and enlarged-diameter portion, the port in the projection is not obstructed and sealed against fluid flow.

According to one embodiment of the preferred invention, the receptacle includes a purge passage for selective alignment with the port in the projection.

According to one embodiment of the preferred invention, the relative movement between the projection and the receptacle occurs hydraulically by employing the hydraulic sled that moves the injection unit relative to the mold.

Other objects, features, and advantages of the present invention will become apparent to those skilled in the art with reference to the drawings and detailed description of the invention, which follow.

DETAILED DESCRIPTION OF THE INVENTION

Figure 1:
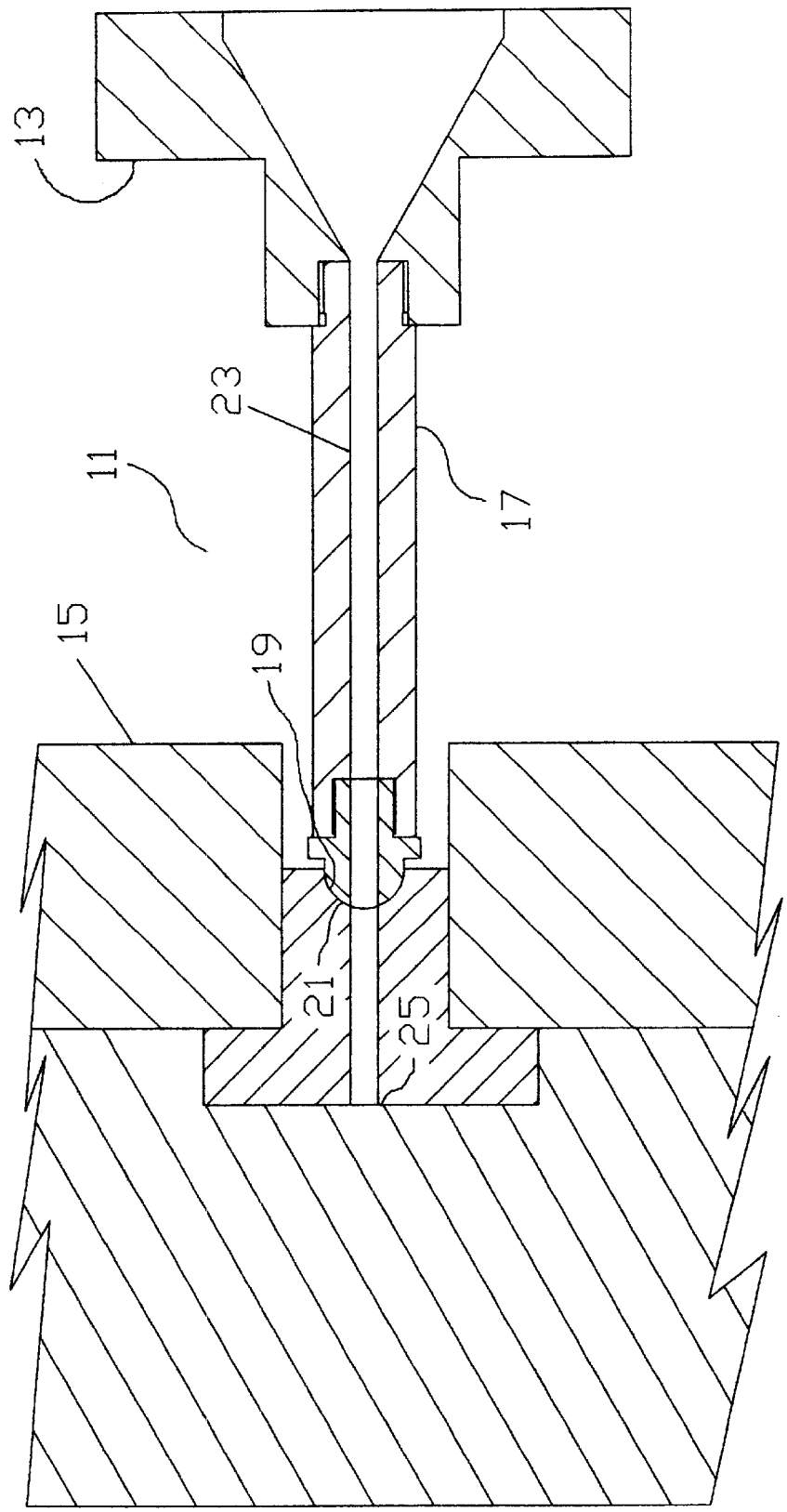
FIG. 1 is section view of a prior-art coupling.

Referring now to the Figures and particularly to FIG. 1, a prior-art coupling 11 between an injection unit 13 and mold 15 (the platen portion of the mold is shown) is shown. The injection unit is entirely conventional and an elongate projection or nozzle 17 extends from it and terminates in a hemispherical end piece 19. The hemispherical end piece registers with and is received in a convex hemispherical depression or receptacle 21 formed in a portion of the mold known as the sprue bushing. The two mating hemispherical portions provide a self-centering or aligning feature so that fluid passages 23, 25 in the projection and the mold are aligned and fluid communication is established between the injection unit and the mold. This prior art coupling has no "shut-off" feature: the mold and injection unit are either connected or they are not, there is no ability to shut-off flow from the injection unit. Typically, the injection unit is mounted on an hydraulic sled to permit relative movement and engagement between the nozzle and the sprue bushing and to perform the "sprue break" operation discussed above.

Figure 2:
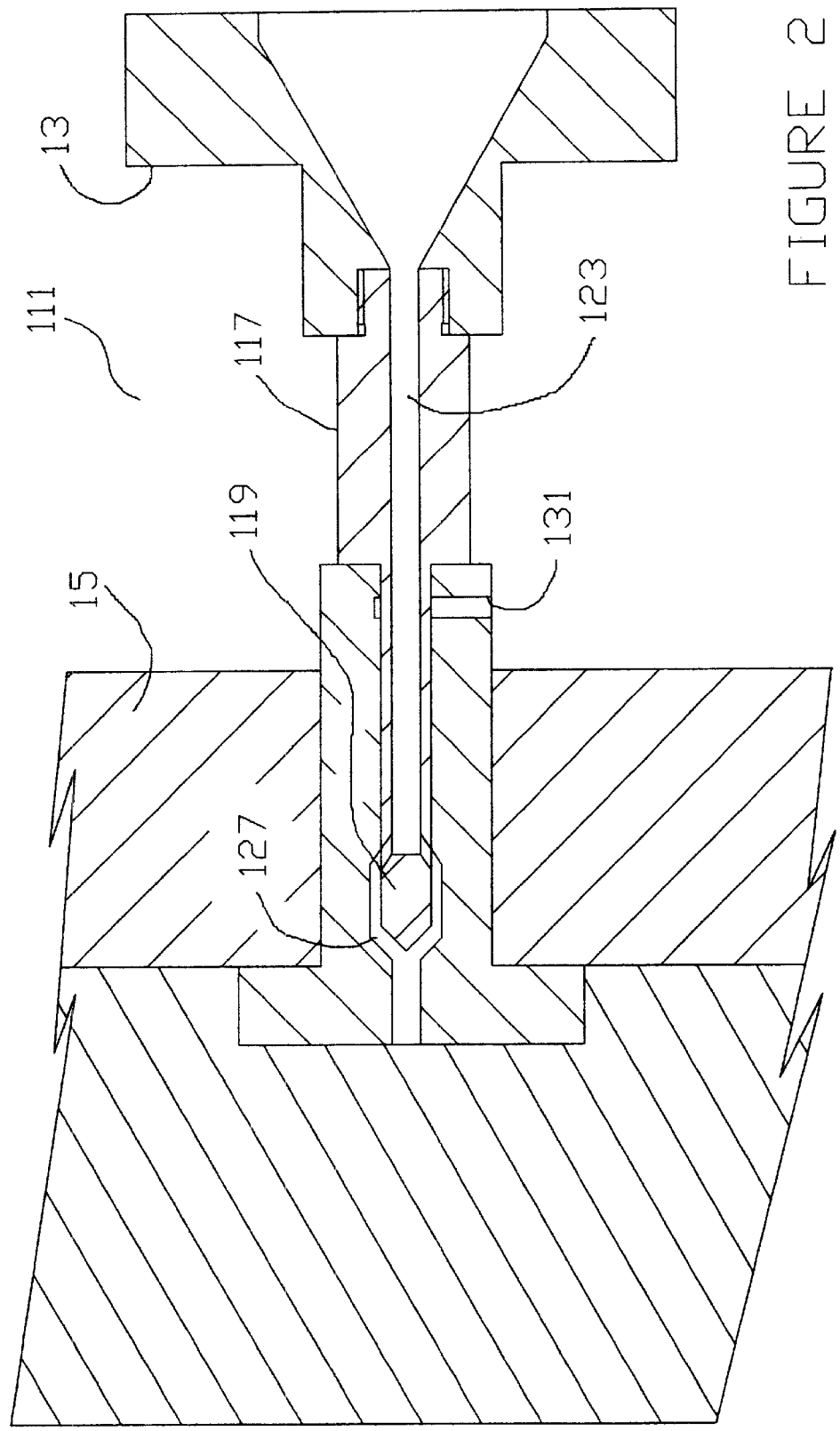
FIG. 2 is a section view of the shut-off coupling according to the present invention in an open, flowing position.
Figure 3:
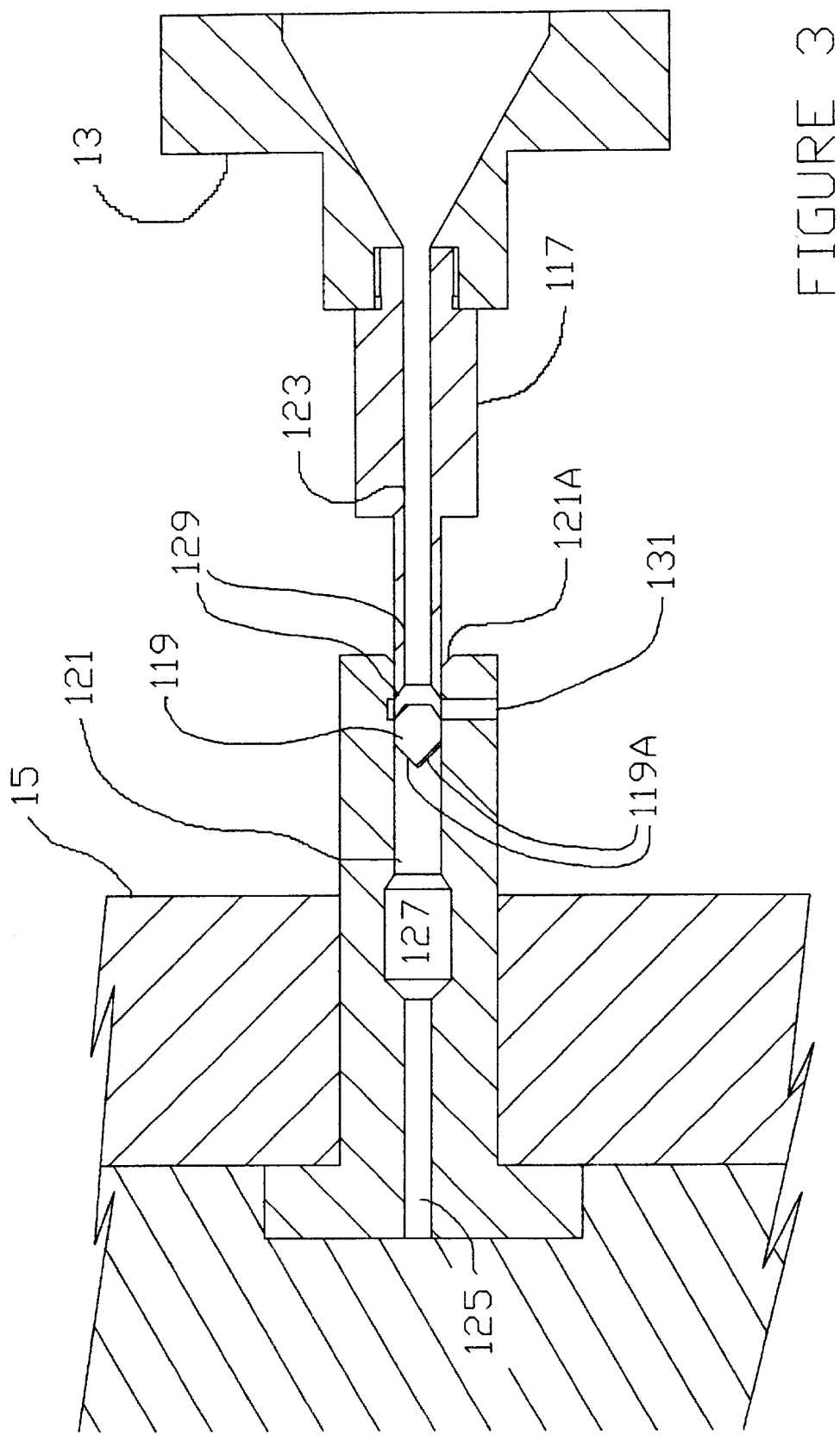
FIG. 3 is a section view of the shut-off coupling according to the present invention in a closed, purging position.
Figure 4:
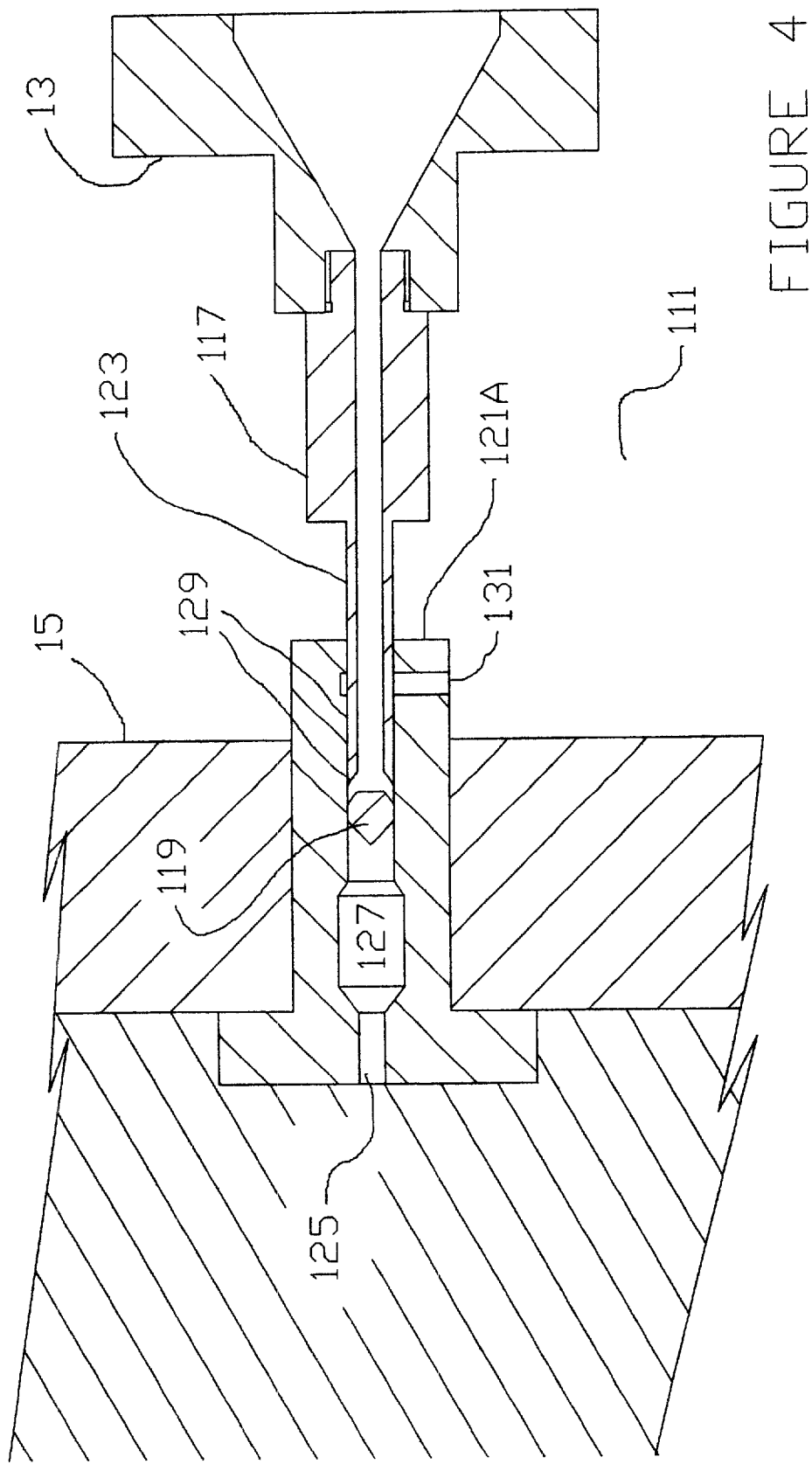
FIG. 4 is a section view of the shut-off coupling according to the present invention in a closed position in which flow between the injection unit and mold is not permitted.

FIGS. 2, 3, and 4 are section views illustrating the shut-off coupling 111 according to the present invention. Coupling 111 comprises an elongate projection or nozzle 117 having a generally cylindrical configuration at end piece 119 (which need not be and is not a separate part) and along its length. Nozzle end piece 119 is received in concentric slidable relation in a generally cylindrical recess or receptacle 121 formed in the sprue bushing. The recess is dimensioned to receive the nozzle end piece in sliding relation, but sufficiently tightly to seal against fluid leakage in the gap between them. Although not shown, o-rings or other elastomeric seal elements may be carried by the nozzle or the receptacle to enhance the seal capabilities of the arrangement. Finally, the end piece is provided with a conical end 119A and the receptacle opening is provided with a concave conical opening 121A to provide a self-centering and aligning feature.

Fluid passages 123, 125 are formed in the nozzle and sprue bushing and permit fluid communication between the injection unit and the mold cavity portion of the mold. An portion 127 is formed at a selected depth or distance within the receptacle. At least a pair of generally transverse ports 129 are formed in the end piece of the nozzle and are in fluid communication with the passage in the nozzle. Thus, when the end piece reaches the selected depth or distance into the receptacle at which the enlarged-diameter portion is formed, fluid flow between the passages 123, 125 and fluid communication between the injection unit and mold are established, as shown in FIG. 2.

When the end piece and ports 129 are at a depth in the receptacle less than that of the enlarged-diameter portion, the ports are obstructed and fluid communication between the injection unit and mold is "shut-off," as shown in FIG. 4. The end piece can also be moved to a position at which ports 129 are only partially obstructed. By forcing plastic through a smaller opening, the shear rate is increased, the viscosity of the plastic is decreased, and the molding process can be further controlled.

A purge port 131 is provided near the opening of the receptacle. When the end piece and nozzle are at the depth of the purge port, the ports 129, 131 are aligned and flowable plastic may be purged from the system. In other words, flowable plastic flows out of the injection unit and nozzle, but does not flow into the mold. This can be useful at start-up to purge air from the dead spaces in the nozzle and injection unit to insure a full first shot.

Relative movement between the injection unit and mold provides the actuation for the shut-off coupling. Most injection molding machines or apparatus are provided with an hydraulically or electrically actuated sled. This arrangement may be used, with appropriate controls, such as limit switches or linear transducers, to move the probe and receptacle relative to one another and the coupling between the "open," "shut-off," and "purge" positions.

Figure 5:
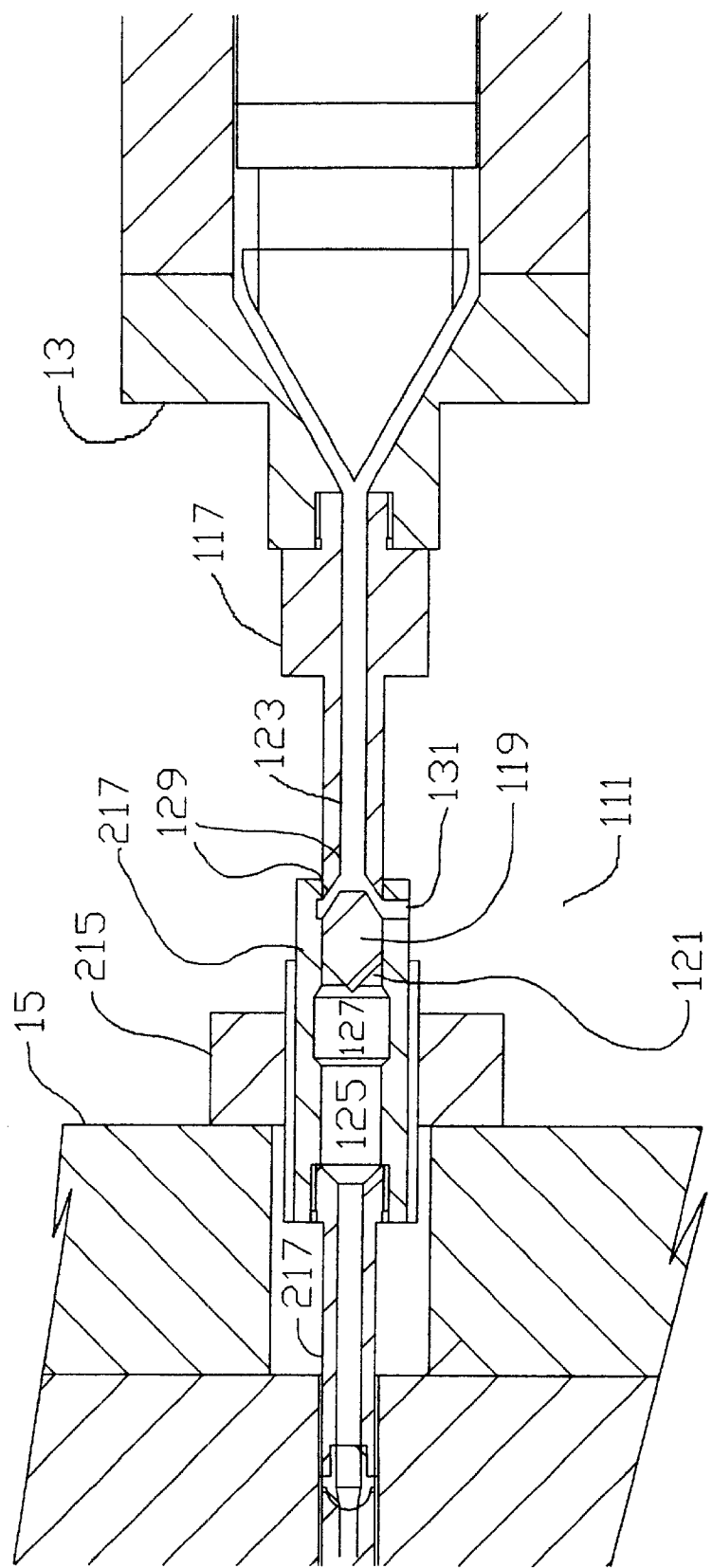
FIG. 5 is a section view of an alternative embodiment of the present invention.

FIG. 5 illustrates an alternative embodiment of the present invention. In the embodiment of FIGS. 2–4, the conventional nozzle 17, which is connected by threads to injection unit 13, is simply replaced, along with the conventional sprue bushing portion of the mold 15. In this embodiment, an adapter, consisting of two pieces 215, 217, one of which 215 is bolted to the platen portion of the mold and contains internal threads to receive elongate receptacle piece 217. The conventional hemispherical coupling illustrated in FIG. 1 is still employed, but it is not the major connection between the injection unit and mold. Thus, the shut-off nozzle according to the present invention is well adapted to be sold in a kit form for retrofitting existing apparatus as well as for original equipment manufacture.

In operation, projection 117 and injection unit are moved into position such that the end piece 119 is received in receptacle 121 in the mold. More precise relative movement between the mold and injection unit moves end piece 119 within receptacle 121, aligning ports 129 with enlarged-diameter portion 127 (open or flowing position), purge port 131 (purge position), or an intermediate position in which the ports are fully or partially obstructed (shut-off or viscosity-control position). By moving projection 117 in receptacle 121 past enlarged-diameter portion 127 (in the embodiment of FIG. 5) when passage 125 is filled with plastic and injection is complete, additional injection pressure can be exerted, permitting "pack-and-hold," and "pull-back" or mold decompression (relaxing injection pressure to prevent mold drool) operations without using the plasticizing screw.

The coupling and shut-off valve according to the present invention present a number of advantages. The coupling is far more positive and leak-resistant than the prior art. The shut-off valve is simple, easily manufactured, positive in operation, and requires no additional power source for actuation.

The present invention has been described with reference to preferred embodiments. It is thus not limited, but is susceptible to modification and variation without departing from the scope of the invention.

I claim:

1. A coupling between an injection unit and a mold in an injection molding apparatus, the injection unit for injecting flowable polymer into the mold, the coupling comprising:
   an elongate projection from one of the injection unit and the mold;
   a passage extending through the projection in fluid communication with the injection unit; and
   a generally cylindrical receptacle formed in a portion of the mold for receiving the projection in generally concentric sliding relation, the receptacle being in fluid communication with the mold, wherein relative sliding movement of the projection between an open and a shut-off position within the receptacle causes the injection unit to be selectively in fluid communication with the mold.

2. The coupling according to claim 1, herein the elongate projection includes a generally conical end portion.

3. The coupling according to claim 1, wherein the receptacle has a generally conical opening.

4. The coupling according to claim 1, wherein the elongate projection includes at least one port extending transversely and in communication with the passage.

5. The coupling according to claim 4, wherein the receptacle is dimensioned to obstruct and seal the port in the projection against fluid flow.

6. The coupling according to claim 5, wherein the receptacle includes an enlarged-diameter portion, wherein, upon alignment with between the projection and enlarged-diameter portion, the port in the projection is not obstructed and sealed against fluid flow.

7. The coupling according to claim 4, wherein the receptacle includes a purge passage for selective alignment with the port in the projection.

8. The coupling according to claim 1, wherein the relative movement between the projection and the receptacle occurs hydraulically.

9. A shut-off coupling between an injection unit and a mold, the shut-off coupling comprising:
   an elongate probe extending from the injection unit;
   an end piece on the probe opposite the injection unit;
   a passage extending through the probe and end piece and in fluid communication with the injection unit;
   a generally cylindrical receptacle in a portion of the mold, the receptacle dimensioned to receive the probe and seal with the end piece against fluid leakage, wherein relative movement of the end piece within the receptacle moves the coupling between an open position, in which the passage is not obstructed and the mold and injection unit are in fluid communication, and a shut-off position, in which the passage is obstructed and the mold and injection unit are not in fluid communication.

10. The coupling according to claim 9, wherein the end piece is generally cylindrical and includes a generally conical end portion.

11. The coupling according to claim 9, wherein the receptacle has a generally conical opening.

12. The coupling according to claim 9, wherein the end piece includes at least one port extending transversely and in communication with the passage.

13. The coupling according to claim 12, wherein the receptacle is dimensioned to obstruct and seal the port in the projection against fluid flow.

14. The coupling according to claim 13, wherein the receptacle includes an enlarged-diameter portion, wherein, upon alignment with between the projection and enlarged-diameter portion, the port in the projection is not obstructed and sealed against fluid flow.

15. The coupling according to claim 12, wherein the receptacle includes a purge passage for selective alignment with the port.

16. The coupling according to claim 9, wherein the relative movement between the projection and the receptacle occurs hydraulically.

17. A shut-off coupling between an injection unit and a mold, the shut-off coupling comprising:
   an elongate probe extending from the injection unit, the probe terminating in a generally cylindrical end piece;
   a passage extending through the probe and in fluid communication with the injection unit, the passage terminating in the end piece;
   at least one port formed in the end piece and in fluid communication with the passage;
   a generally cylindrical receptacle in a portion of the mold, the receptacle dimensioned to receive the probe and seal with the end piece against fluid leakage, wherein relative movement between the injection unit and mold moves the end piece within the receptacle between an open position, in which the port is not obstructed and the mold and injection unit are in fluid communication, and a shut-off position, in which the port is obstructed and the mold and injection unit are not in fluid communication.

18. The coupling according to claim 17, wherein the end piece includes a generally conical end portion.

19. The coupling according to claim 17, wherein the receptacle has a generally conical opening.

20. The coupling according to claim 17, wherein the receptacle includes an enlarged-diameter portion, wherein, upon alignment with between the projection and enlarged-diameter portion, the port in the projection is not obstructed and sealed against fluid flow.

21. The coupling according to claim 17, wherein the receptacle includes a purge passage for selective alignment with the port, the purge passage being in fluid communication with an exterior of the mold.

22. The coupling according to claim 17, wherein the relative movement between the mold and injection unit occurs hydraulically.

23. The coupling according to claim 17, wherein the port is only partially obstructed, permitting viscosity control.

24. A kit for modifying an injection unit and mold of an injection molding apparatus to provide an improved coupling therebetween, the kit comprising:
   an elongate receptacle member for attachment to a portion of the mold, the elongate portion having a generally cylindrical receptacle in fluid communication with the mold;
   a probe member for attachment to a portion of the injection unit, the probe member in fluid communication with the injection unit and terminating in a generally cylindrical end piece dimensioned to be received in the receptacle;
   wherein the end piece is received in the receptacle in generally concentric sliding relation and movement of the end piece between an open and closed position within the receptacle selectively places the injection unit and mold in fluid communication.

25. The kit according to claim 24, wherein the end piece includes a generally conical end portion.

26. The kit according to claim 24, wherein the receptacle has a generally conical opening.

27. The kit according to claim 24, wherein the receptacle includes an enlarged-diameter portion, wherein, upon alignment with between the projection and enlarged-diameter portion, the port in the projection is not obstructed and sealed against fluid flow.

28. The kit according to claim 24, wherein the receptacle includes a purge passage for selective alignment with the port, the purge passage being in fluid communication with an exterior of the mold.

29. The kit according to claim 24, wherein the relative movement between the mold and injection unit occurs hydraulically.

30. The kit according to claim 24, wherein the elongate member is secured to the sprue bushing by threads.

* * * * *